United States Patent Office 3,163,113
Patented Dec. 29, 1964

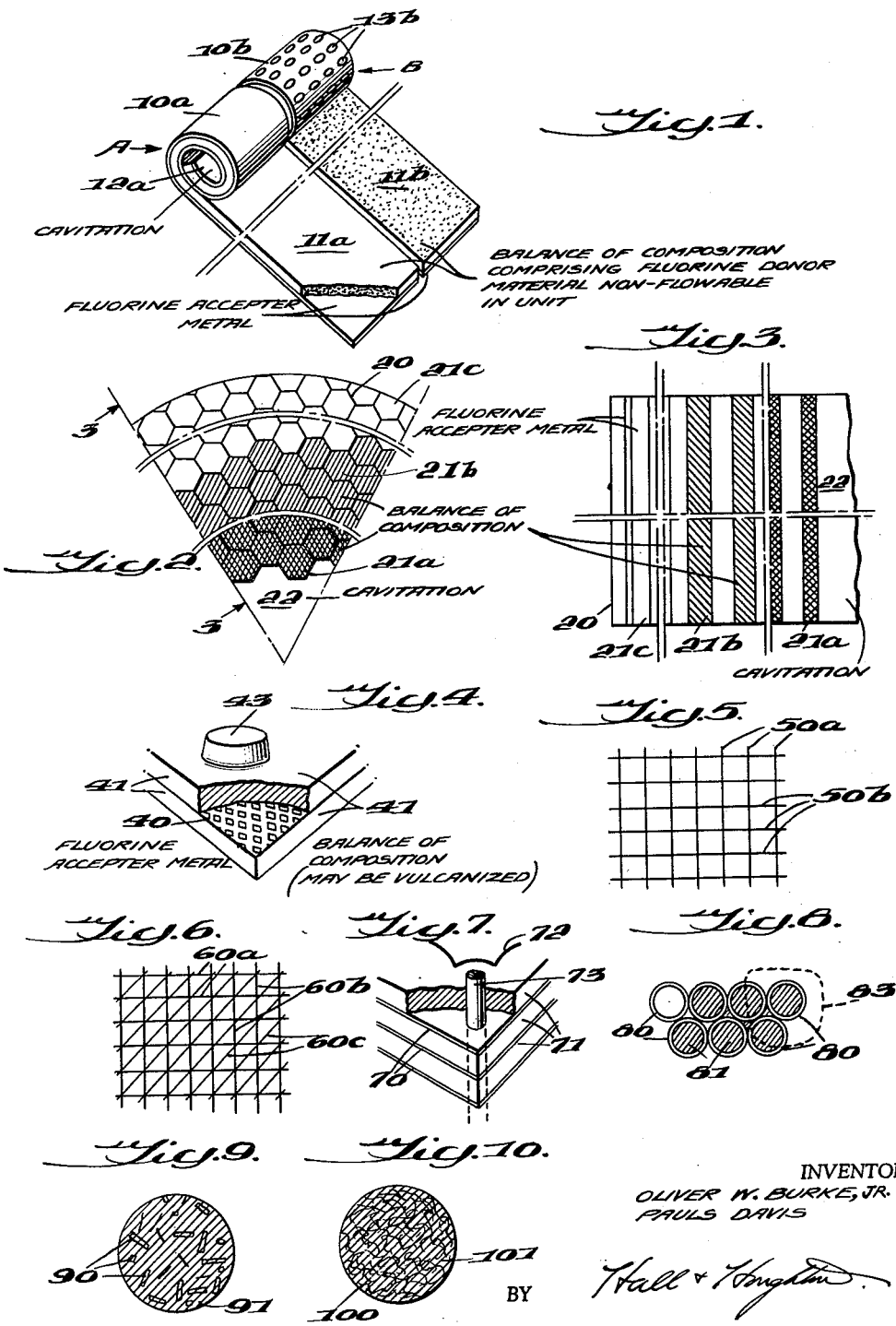

3,163,113
HIGH ENERGY FUEL UNITS AND ASSEMBLIES
Pauls Davis, Mount Clemens, Mich., and Oliver W.
Burke, Jr., 1238 Berkshire Road, Grosse Pointe Park,
Mich.; said Davis assignor to said Burke
Filed Jan. 12, 1959, Ser. No. 786,382
14 Claims. (Cl. 102—98)

This invention relates to high energy fuel units and assemblies, and aims generally to improve the same. Particularly, but not exclusively, the invention aims to provide a self-sustaining high energy fuel unit comprising fluorine donor material together with metallo-fluorine acceptor material at least in part in the form of free metal, and in which at least a part of such free metal acceptor is in the form of structural reinforcement which lends structural stability to the combination and at the same time is intimately and relatively uniformly associated with the other ingredients of the fuel unit.

The present invention is a structural modification and/or improvement on the more general invention of the present applicants with Urs F. Nager set forth in a copending application for New Missile Fuel Compositions and Methods of Preparing Same, U.S. application Ser. No. 781,217 filed Dec. 18, 1958. In said copending application new high energy fuel compositions are disclosed comprising fluorine donor materials and metallo-fluorine acceptor materials at least one of which is organic, including certain ones in which the fluorine donor is either gaseous, limpid liquid, viscous liquid, or solid, and in which the fluorine acceptor is either in the form of a free fluorine-acceptor metal or a fluorine acceptor metallo-compound, and in which either the donor or acceptor material or both may be polymeric in whole or in part; which fuel compositions may also include a proportion of oxygen containing oxidant, preferably in a quantity sufficient to combine with at least a part, or all, of the carbon, or carbon and hydrogen, liberated by reaction of the fluorine-donor and metallo-fluorine acceptor materials.

The present invention is applicable only to those embodiments of the said more general invention in which the fluorine acceptor material is at least in part composed of a free-metal fluorine acceptor, and in which the fluorine donor material, alone or in combination with the other ingredients of the fuel (i.e. other fluorine acceptor material, and/or oxygen containing oxidant), either before or after a curing or vulcanizing operation, is non-flowable from the unit and hence retained therein.

The present invention has for one of its objects the improvement of the structural stability of fuel units of such composition, by fabricating and combining the free-metal fluorine acceptor material in the unit in a form capable of reinforcing and lending structural stability to the whole unit while maintaining the structurally fabricated free metal in adequately intimate and uniform distribution throughout the unit to serve its fluorine acceptor function. Other and further objects and advantages of the invention and of particular embodiments thereof will be apparent from the following detailed description of preferred embodiments thereof. The invention resides in the novel features and combinations exemplified in the illustrative embodiments, and is more particularly pointed out in the appended claims.

In the accompanying drawings of illustrative embodiments of the invention

FIG. 1 is a perspective view of a partially unrolled assembly of rolled units;

FIG. 2 is a more or less diagrammatic plan view of a portion of a first embodiment of unit (employing an annular honeycomb type of reticulated reinforcing acceptor);

FIG. 3 is a fragmentary section taken on a radius of FIG. 2, in the direction indicated by the arrows 3—3 on FIG. 2;

FIG. 4 is a more or less diagrammatic view of another reticulated acceptor embodiment;

FIGS. 5 and 6 are diagrammatic plan views of other (egg crate or grille type) reticulated acceptor embodiments;

FIG. 7 is a perspective view of a portion of a laminar embodiment;

FIG. 8 is a plan view of another (bundled tube type) reticulated acceptor embodiment;

FIG. 9 is a diagrammatic view of a portion of a chopped wire reinforcing acceptor embodiment;

FIG. 10 is a similar view of a portion of a metal wool reinforcing acceptor embodiment.

In the embodiment illustrated in FIG. 1 of the drawings, the fuel charge comprises a plurality of units A and B, each made up of a high energy fuel composition comprising at least one fluorine donor material and at least one fluorine acceptor material. At least a part of the fluorine acceptor material in each unit consists of structural metal $10a$, $10b$ arranged in structurally reinforcing form. In unit A by way of example, the structural metal portion $10a$ of the composition is in the form of a sheet metal or foil lamination, the balance of the composition $11a$ also being in laminar form and being superimposed on lamination $10a$, the two being rolled into a tube having a central cavitation $12a$ therein; while in unit B, by way of example, corresponding laminations $10b$ and $11b$ are employed, but of different physical structure for controlling the burning rates, the lamination $10b$ of metal acceptor material being shown as reticulated (e.g. perforated at $13b$) and the lamination $11b$ being stippled to indicate the inclusion therein of chopped wire or particulate metallo acceptor material or other modifying component of the fuel composition as hereinafter described. In the form shown both units A and B are rolled in the same manner so that the cavitation, $12a$ in the first unit, extends correspondingly as a cavitation $10b$ in the unit B, etc., through a plurality of the units.

The balance of the composition $11a$, $11b$ in the embodiment of FIG. 1, is non-flowable in the rolled unit, that is, it is effectively in solid form, which term, as employed in connection with FIG. 1, is generic to viscous liquid, elastomeric, and plastomeric forms, and combinations of such forms. Thus in the completely rolled units A and B the structural metal portion of the units is in the form of thin walls $10a$ or $10b$ by which the balance of the composition $11a$ or $11b$ is retained, said structural metal portions lending structural stability to the unit and being exothermally consumed by reaction of the metal thereof with fluorine from the fluorine donor material in the balance of the composition $11a$ or $11b$ during the energy generating reaction of the unit. As hereinafter more fully set out, the balance of the composition $11a$ or $11b$ may consist at least in part of vulcanizable material, and may be adherable per se, or through an intervening adhesive coating, to the structural metal portion $10a$, $10b$, and may be vulcanized in place with the structural metal portion of the unit, in which case no other securement is necessary to retain the rolled unit in fabricated (tubular) form. Otherwise the fully rolled unit may be retained in tubular form in any suitable manner, as by the application of a pin or pins (such as the tubular pin shown in FIG. 7), a staple or staples, cut and pressed out locking tang means, surrounding band or jacket means, or other known expedient (not shown); which fastening expedient, whether of adhesive or mechanical form is preferably of material capable of exothermally reacting with fluorine so that it may also contribute to the energy generating reaction of the unit.

The components of the unit are preferably ones having a high ignition temperature. For example, the structural metal portion 10a or 10b may consist of beryllium, magnesium, aluminum, titanium, combinations of two or more thereof, and alloys of any of these metal materials with one or more other metals, to lend special structural characteristics to the combinations, and may be in thin walled form such as sheet, foil, expanded metal, woven fabric or other forms; and the balance of the unit 11a or 11b may principally consist of fluoropolymer such as tetrafluoroethylene polymer ("Teflon" of E. I. du Pont de Nemours & Co.), trifluoro-mono-chloro-ethylene polymer ("Kel–F" polymers of Minnesota Mining & Mfg. Co.), and/or perfluoropropylene/vinylidene fluoride copolymers (Du Pont's "Viton A" type polymers) or the like, thus providing a highly stable unit or assembly, made up of materials normally regarded as fire resistant, but the combination of which, as disclosed in the aforesaid copending application Ser. No. 781,217 constitutes a high energy fuel system when locally raised to igniting temperature as by contact therewith of a hot wire, a flame, or other ignition means.

While the forms shown in FIG. 1 are among the simplest to fabricate into units and charges, the invention may be embodied in many other forms without departure from its general principles as herein set forth.

Thus the structural metal fluoride acceptor may be fabricated into any other desired geometric cellular formation; for example, as shown in FIGS. 2 and 3 one having the form of a honeycomb structure 20 (producible by known methods), such structure preferably being of annular or doughnut shape as shown to provide a cavitation 22 through the unit or units, and the reticulations between the thin walls of the honeycomb receiving and retaining the balance of the compositions 21a, 21b in non-flowing form, which term in such instance is generic to capillary-retained, viscous liquid, elastomeric, and plastomeric forms (vulcanized and non-vulcanized) and combinations thereof.

As also shown in FIGS. 2 and 3 the balance of the composition may comprise portions such as 21a and 21b of different burning rates to provide the desired control and to compensate for increase in burning area when ignition occurs first along the cavitation, and/or to provide change in rate of reaction appropriate to the progressively changing conditions (speed, altitude, angle, etc.) of the rocket or missile being powered by the units. Likewise of course the geometry of the structural portions of the unit (wall thicknesses, size, etc.) may be varied to effect such compensation.

To still further exemplify the fact that the invention may be embodied in many forms, reference may be had to FIGS. 4 to 10.

In FIG. 4, for example, the reticulated structural metal fluorine acceptor 40 is of screen, woven wire fabric, or punched, or slit and stretched "expanded metal" form, all per se well known. In the expanded metal form the thin walls of the metal 40 may be pressed into a common plane or may extend in whole or in part transversely of such plane. Also as illustrated in FIG. 4, the laminated unit may comprise any suitable anchoring means, exemplified by the molded-in or pressed-out lugs 43 for mating with matching recesses in adjacent units, for aligning a stack of units to form an assembly or charge.

In FIG. 5, for further example, the reticulated thin walled structural metal fluorine acceptor is shown as fabricated in "egg crate spacer" form (strips 50a–50b) slotted through a portion, usually half, of their height and assembled by pushing the downwardly facing slots of one set of strips 50a beyond the upwardly facing slots of another transversely arranged set 50b, as frequently employed in making the "cube separators" for ice trays for example, thus providing a geometric cellular formation. FIG. 6 comprises a similar "egg crate" form of reticulated structural metal fluorine acceptor 60a, 60b, with further diagonal strips 60c secured therein (which may be slotted on both edges and be retained in overlapping portions of the slots of strips 60a and 60b like those employed in FIG. 5) thus providing a different geometric cellular formation.

Again as shown in FIG. 7, the units, and charges, may be made up of acceptor metal laminations 70 of similar or dissimilar imperforate or perforate sheet or foil, woven fabric, expanded metal, or the like, and laminations 71 of the balance of the fuel composition, of similar or dissimilar constitution, for controlling the burning rate, which laminations may be of any geometrical shape desired for facilitating assembly in the rocket or missile, and may be formed with one or more cavitations 72 therein or therethrough of any desired geometrical shape (compare FIG. 1 and FIGS. 2 and 3). Any suitable means may be provided for aligning and/or anchoring the laminations in place in the unit or in the assembly, exemplified in FIG. 7 by one or more pins or staples 73, preferably thin walled tubes of acceptor metal, as shown, which may be used alone or in combination with interfitting deformations or other fastening expedients as above described.

Still further forms illustrating the broad scope of the invention are shown in FIGS. 8–10. In FIG. 8, for example, the reticulated acceptor structure is made up of bundled tubes 80 of acceptor metal, the balance of the composition 81 being retained within and/or between said tubes, the portions of the unit being sensitized by adhesive, vulcanization, band or jacket means, or in any other suitable fashion. When the tubes are of relatively large size, the balance of the composition is preferably of a solid, elastomeric, or plastomeric or highly viscous liquid nature to assure its retention. When the openings in or between the tubes approach capillary size, less viscous liquid material may be retained therein by adhesion and cohesion; when of capillary size, quite limpid liquid materials may be retained therein, and such may also be done with large tubes when flow of the liquid from the tubes is obstructed by a plugging of the ends of the units with a solid elastomeric or plastomeric portion 83 of the composition 81, which portion may also constitute the means for fastening the assembly of tubes into a bundle when it extends in a substantially unbroken sheet, or mesh of capillary size, across the end of the unit (as indicated by the dotted-in portion 83 in FIG. 8).

In FIG. 9, for further example, the thin walled structural metal acceptor 90 is shown in filamentary form (e.g. chopped wires, ribbons, etc. of any desired cross-section) embedded in and structurally reinforcing the balance of the composition 91, while in FIG. 10 it is shown in the form of metal wool or the like 100, similarly embedded in and reinforcing the balance of the composition 101, and the so self-reinforced composition may be formed into units with or without cavitations and other features above mentioned, per se, or may be employed (where not all the metal fluorine acceptor is in the form 90 or 100) as balance of the composition for filling or capping of reticulated structures of any form adapted to receive the same as exemplified in FIGS. 1–8.

As above noted, the present invention relates to the structural fabrication of the high energy fuel units comprising fluorine donor material and fluorine acceptor material at least a part of which is an acceptor metal. Subject to these limitations and to the limitation that the composition be stable under the conditions of charging and handling prior to intentional ignition, the balance of the composition may be varied at will.

As previously mentioned, the aforesaid copending application Ser. No. 781,217 the disclosure of which is included herein by reference, sets forth compositions which ignite spontaneously as well as compositions which meet the criteria for the present invention. Furthermore, while in said application Ser. No. 781,217 one criteria is that at least one of the donor or acceptor materials be at least in part organic, i.e. a carbon compound, and while the present invention is particularly adapted to compositions of that nature, especially when such include polymeric or vulcanizable materials, in its broader aspects the present invention contemplates also the use of fluorine acceptor and donor materials neither of which is organic, provided such meet the limitations set forth in the preceding paragraphs. Merely for completeness herein reference will now be made to some illustrative examples of the materials suitable for fabrication into fuel units and assemblies as herein contemplated:

(a) FLUORINE ACCEPTORS

All metals, without known exception, are capable of combining with fluorine, the rate and degree of attack being dependent on the state of subdivision of the metal and on the temperature. However, the exothermal heat generated by the reactions varies widely with different metals, and some of the metals which combine with fluorine with high evolution of energy (e.g. lithium, sodium, potassium and the like) are, per se, dangerous for structural fabrication because under certain conditions they may initiate spontaneous ignition of the fuel units. Hence the preferred structural acceptor metals exclude the alkali metals, and the like, but include other metals having high heats of combustion with fluorine, e.g. magnesium, aluminum, titanium and beryllium, combinations of two or more thereof, and alloys of any of these metals with one or more other metals, including the stable alkali-metal allows, to impart special characteristics such as strength, ductility, etc. to the structural reinforcing. Examples of such structural alloys, especially with reference to aluminum and magnesium alloys, are well known in the metallurgical arts. See for example "Properties of Aluminum and Its Alloys", Aluminum Development Assoc., London, 1955; "Technology of Light Metals", Van Zeerleder, Elsevier Publ. Co., Inc., N.Y., 1949; "The Light Metals Handbook", Pagonis, D. Van Nostrand Co., Inc., N.Y., 1954; "ASTM Standards on Light Metals and Alloys", December 1957.

Other fluorine acceptor materials which may be used in the balance of the fuel composition (combined with the structural metal acceptors in accordance with this invention) include but are not limited to the following:

(1) The metallic fluorine acceptor materials, e.g. from group I of the periodic table (employable, especially in alloy form, as powders or dispersions, etc.), lithium, sodium and potassium; from group II, magnesium, beryllium, calcium, zinc, strontium and cadmium; from group III, aluminum and boron; from group IV, titanium, tin and zirconium; from group V, vanadium, antimony, and columbium; and combinations of the foregoing including mixtures and alloys with or without other metals in minor proportions as dictated by economic and other factors, and with and without minor proportions of non-metallic elements such as carbon.

(2) The metal-nitrogen fluorine acceptor materials e.g. the nitrides, amides and azides of lithium, sodium and potassium, etc., and borazole.

(3) The metal hydride fluorine acceptors including (i) liquid or liquifiable metal hydrides, e.g., diborane, pentaborane, aluminum borohydride and borazole and (ii) solid metal hydrides e.g., lithium, sodium and potassium hydrides and such alkali metal-aluminum hydrides, and such alkali metal-borohydrides and -diboranes, beryllium borohydrides, aluminum borohydrides and decaborane.

(4) The liquid fluorine acceptor organo-metallic materials including the alkyl, alkenyl and alkynyl, aryl, alkaryl, aralkyl and cyclohydrocarbon lithium, beryllium, zinc, cadmium, boron and aluminum compounds and combinations of these when liquid;

(5) Solid fluorine acceptor organo-metallic materials including (i) the mono-metallated organo-metallic compounds i.e., those in which only a single metal group is bound in the compound through a metal to carbon bond or a metal-nitrogen-carbon bond, e.g., the solid alkyl, alkenyl, alkynyl, aryl, alkaryl, aralkyl and cyclohydrocarbons of lithium, sodium, potassium, beryllium, magnesium, boron; and lithium-aluminum alkyl compounds; and (ii) the multiply metallated organo-metallic acceptors including those compounds with two or more metal groups such metal groups having a metal to carbon bond or a metal-nitrogen-carbon bond and these in turn can be divided into (a) non-polymeric and (b) polymeric.

Numerous specific examples of each of these groups and categories of acceptor materials are set forth in said application Ser. No. 781,217, and are incorporated herein by reference, but are not herein further set out as the invention herein is believed not limited to the particular materials used in the balance of composition, except where specifically set forth and claimed herein.

(b) FLUORINE DONORS

The fluorine donor materials, as disclosed in the aforesaid copending application Ser. No. 781,217 may be inorganic or organic. Inorganic fluorine donors most of which are liquids or liquifiable gases comprise: fluorine per se; fluorine containing mixed halogens, e.g. chlorine trifluoride, etc.; nitrogen-fluorine compounds such as nitrogen fluoride, and oxygen containing compounds of the foregoing, e.g. oxygen difluoride, dioxygen difluoride, fluorine chlorate, fluorine perchlorate, nitrosyl fluoride, etc. Organic fluorine donors comprise those which are non-polymeric, most of which are liquids or liquifiable gases, and those which are polymeric. The organic donors include carbon and fluorine, with or without other halogens and/or hydrogen and/or nitrogen and/or oxygen. Such may be aliphatic or aromatic or heterocyclic. Examples of such fluorine compounds are well known in the literature, see for example "Aliphatic Fluorine Compounds" by Lovelace et al., Reinhold Pub. Corp., N.Y., 1958 and "Fluorine Chemistry," J. H. Simons, Academic Press, Inc., N.Y., 1958.

The polymeric organic donor materials (usually solids including elastic and plastic solids, in some instances liquids) include polymers, copolymers (including graft copolymers), and mixed polymers which are partially or completely fluorinated with or without hydrogen, other halogen, nitrogen and/or oxygen substituents. Such polymers include at least partially fluorinated polyesters, polyamides, polyurethanes and the polymers produced by carbon-to-carbon unsaturated bond polymerization including the at least partially fluorinated vinyls, vinylidenes, allyls, dienes (including conjugated dienes) and the like; polymers containing partially or completely fluorinated carbon segments; the symmetrical triazine structure; the perfluoroglutaroamidine and perfluoroadipodiamidine copolymers of H. C. Brown and the like; the fluoro and perfluoro phosphinic nitride polymers; the fluorosiloxane polymers; polymers and copolymers of fluorinated and partially fluorinated aldehydes e.g., $CF_3CHO$, and fluorinated or partially fluorinated nitroso compounds e.g., $CF_3NC$, and copolymers of these with fluorinated and partially fluorinated olefins, vinyl ethers, etc., e.g., tetrafluoroethylene, trifluorochloroethylene, perfluoropropylene, etc. The fluorine containing monomers from which the polymers included herein are prepared include vinyl fluoride, vinylidene fluoride, 1,1-difluoroethylene, trifluorochloroethylene, trifluorobromoethylene, difluorodichloroethylene, difluorodibromoethylene, the fluoro-dichloroethylenes, the fluorodibromoethylenes, fluorotrichloroethylenes, fluorotribromoethylenes, the partially and completely fluorinated polymerizable olefins e.g., perfluoropropylene; the mixed fluorochloro, fluorobromo and fluorochlorobromo partially and completely halogenated alpha-olefins such as propylene, the butylene and isobutylene series and polymerizable higher α-olefins, and further including partially or completely halogenated polymerizable vinyl monomer material including the fluoro, fluorochloro, fluorobromo and fluorochlorobromo partially or completely substituted styrene, vinyl toluenes, acrylates, methacrylates, vinyl ethers, vinyl ketones, and the partially or completely fluoro-halogenated polymerizable conjugated and non-conjugated dienes. The polymers from halogenated monomers having a high content of fluorine are preferred for the purposes of this invention, and such polymers include but are not limited to: tetrafluoroethylene polymers; copolymers of tetrafluoroethylene with such monomers as trifluorochloroethylene, trifluorobromoethylene, trifluoroethylene, vinylidene and vinyl-fluorides, chlorides and bromides; hexafluoropropylene and the like and mixtures of these; the trifluorochloroethylene polymers; copolymers of trifluorochlorethylene with other monomers such as those set forth just above as employable with perfluoroethylene; the polymers from the partially and completely fluorinated acrylates and substituted acrylates such as perfluoroethyl acrylate, 1,1-dihydroperfluorobutyl acrylates and the like; the partially or completely fluoro-halogenated esters of polycarboxylic acids and polyalcohols such as the fluoro-halogenated condensates of adipic acid with glycols, and the like. Many commercial trademark designations are given for the fluorine containing polymers useful herein such as the "Teflon" polymers of Du Pont de Nemours & Company, including Teflon, Teflon-1, Teflon 100-X, etc.; the "Viton" polymers also of Du Pont de Nemours & Company, including Viton A, Viton AHV, etc.; the "KEL-F" polymers of the Minnesota Mining and Manufacturing Company, including the KEL-F and KEL-F800; and the "Fluorolubes" (polymers of trifluorovinylchloride) of the Hooker Electrochemical Company including Fluorolube FS, S, HO, LG, etc. In employing the fluorine containing polymers such may be used singly or in combination with or without other non-fluorinated organic polymer material in intimate dispersion therewith. The fluorinated polymers especially the highly fluorinated polymers are not compatible with non-fluorinated polymers and can only be combined with such by heterogeneous intermixing.

(c) OXYGEN CONTAINING OXIDANT

As noted above, when one or both of the donor and acceptor materials are carbon-, or carbon and hydrogen-containing, one or more oxygen-containing oxidants may be included in the fuel combination in a quantity appropriate to combine with a part, or all, of the carbon, or carbon and hydrogen, evolved by the reaction between the fluorine donor and the fluorine acceptor. Any suitable oxygen containing oxidant may be employed for this purpose. Such comprise those which are (a) liquids or liquifiable gases and (b) those which are solids.

(a) The liquid or liquifiable oxidants include liquid oxygen, ozone, 90% or higher hydrogen peroxide, the oxyhalides other than those containing fluorine, chlorine oxide ($Cl_2O$) etc.; the liquid or liquifiable nitrogen oxides including nitrogen tetroxide and stabilized red fuming nitric acid (contains about 20% oxides of nitrogen calculated as $NO_2$).

(b) The solid oxidants include the metal salts especially the lithium, sodium, potassium and ammonium salts of the per-oxy-acids such as the percarbonates, perborates and perchlorates, the peroxides of the foregoing metals, and the ammonium and metal salts of the acids derived from nitrogen oxides, e.g., the alkali metal nitrates and ammonium nitrate.

(d) MATERIALS HANDLING

In general, energy rich fuel systems should be handled with care. Notwithstanding this general precaution, in solid-liquid systems which ignite only at elevated temperatures, the components may be combined to form a paste or the like and be suitably fabricated into charges.

Similarly, in many instances the solid-solid systems which ignite only at elevated temperatures can be premixed with or without vulcanizing agents, and be fabricated into charges.

In solid-solid systems which ignite only at elevated temperatures, and in which the fluorine donor compound is a polymer, and especially after combination with the solid fluorine acceptor, with or without solid oxidant, such combinations can be vulcanized in known manner with the aid of known vulcanization agents for fluorocarbon polymers which include metal-oxides and in some instances carbonates, and especially organic mono- and polyamines.

Combinations of the systems set forth herein can also be employed. It is often advantageous to combine liquid and solid organo-fluorine compounds. It is likewise frequently desirable to combine different fluorine acceptors, especially the metals, metal hydrides and metal nitrogen compounds as set forth above.

Furthermore, a liquid organo-fluorine component in some instances may be employed as a plasticizer for a solid organo-fluorine component to facilitate the forming of such into charges.

It is to be understood that minor proportions of non-fluorinated compounds including polymers as binders can be added to the fuel combinations without departing from the essence of the invention. Where accelerated burning rates are desired, catalyst materials in minor amounts may be added, such as metal salts including salts and complexes with organo-oxygen, nitrogen and sulfur compounds of the transition elements, and in some instances small quantities of organo-silicon compounds such as the organo siloxanes are useful catalysts to accelerate combustion rates. Even small quantities of nickel, chromium and the platinum metals which are known to aid dehydrogenation of organic compounds are useful.

For special purposes, low temperature storage and handling may be employed to enable the high energy fuel units of this invention to be fabricated from materials that could not practically be employed in units stored or handled at normal temperatures. Thus if the units are assembled and stored prior to ignition at −100 to −180° C., for example, then such highly effective fluorine donors as nitrogen trifluoride (B.P. −130° C.) dicyanohexafluoride (M.P. −127° C.), dicyanooctafluoride (B.P. below −90° C.), N,N-difluoro-trifluoromethylamine (B.P. −78° C.) may be used as part or all of the fluorine donor material together with the metal-fluorine acceptor and/or any of the other fluorine organometallic or metal hydride or nitride as set forth herein.

For high energy fuels fluorine donor materials containing phosphorous can also be employed herein, especially, the hexafluorophosphates of lithium, potassium and ammonia.

In the solid systems having relatively high ignition temperatures, in many instances powders of the several components (except for the structural metal acceptor component) were intimately mixed and then pressed into intimate contact with the metal fluorine acceptor to form a fabricated charge reinforced thereby. When the fluorine donor was elastomeric and additional finely divided metal or metal hydride was employed as the fluorine acceptor, the finely divided metal or metal hydride in form of powder, flakes, etc., was milled into the elastomer which was then employed as aforesaid; when in such combination an oxygen-containing oxidant was also employed, such was milled into a separate portion of the fluorine containing elastomer and this combination was then milled into the finely divided metal or metal hydride powder-containing portion.

(e) EXAMPLES

Any of the examples of the aforesaid Application Ser. No. 781,217 are adaptable for forming a unit which is stable until intentionally ignited, may be fabricated in accordance with the present invention. Those examples employing as fluorine acceptor a metal or metal alloy capable of structural fabrication, may be fabricated directly in accordance with the present invention with the said metal entirely incorporated in the structural reinforcement, where ignition at the interface thereof at reasonably elevated temperatures is practicable, or partially therein and partially in more finely divided form in the balance of the composition as aforesaid. These examples include the following (Table A):

metal material, fluorine material, and oxygen material,
(b) said metal material being present in said unit in at least substantial part in the form of structural reinforcing metal,
(c) said structural reinforcing metal being selected from the class consisting of beryllium, magnesium, aluminum, titanium, combinations of two or more there-

Table A

| Example No. | Code No. | Fluorine Donor | | Fluorine Acceptor | | Oxygen Oxidant | |
|---|---|---|---|---|---|---|---|
| | | Moles | Compound | Moles | Metal | Moles | Compound |
| 1 | 63 | 1 | Chlorotrifluoromethane | 2 | Magnesium | | |
| 2 | 66 | 1 | $C_6F_{13}(CH_2CF_2)_2I$ | 6 | Aluminum | | |
| 3 | 67 | 2 | $IC_2H_4C_4F_8C_2H_4I$ | 5 | Titanium | | |
| 4 | 68 | 1 | $CHF_2C_4F_8-OH$ | 2 | Vanadium | | |
| 5 | 69 | 1 | $CF_2CCF_3COOC_2F_5$ | 2 | Ferro-Vanadium (90% V) | | |
| 6 | 70 | 4 | $CF_3NO$ | 3 | Lithium-Aluminum | | |
| 7 | 185 | [1] 0.1 | Fluorolube HO-125 | 0.2 | Magnesium | | |
| 8 | 186 | [2] 0.04 | Teflon Powder | 0.10 | Vanadium | | |
| 9 | 187 | ([3]) | do | ([4]) | Ferro-Titanium alloy (28% Ti). | | |
| 10 | 191 | [1] 0.1 | Fluorolube S-30 | 0.4 | Magnesium | 0.05 | Lithium perchlorate. |
| 11 | 192 | [1] 0.1 | do | 0.4 | do | 0.2 | Ammonium nitrate. |
| 12 | 193 | [1] 0.3 | do | 0.4 | Aluminum | 0.15 | Lithium perchlorate. |
| 13 | 194 | [1] 0.3 | do | 0.4 | do | 0.6 | Ammonium nitrate. |
| 14 | 195 | [1] 0.1 | KEL-F | 0.1 | Titanium | 0.05 | Lithium perchlorate. |
| 15 | 196 | [1] 0.1 | KEL-F | 0.1 | do | 0.2 | Ammonium nitrate. |
| 16 | 197 | [2] 0.5 | Teflon | 0.4 | Vanadium | 0.25 | Lithium perchlorate. |
| 17 | 198 | [2] 0.5 | do | 0.4 | do | 0.5 | Ammonium perchlorate. |

[1] Based on chlorotrifluoroethylene.  [2] Based on tetrafluoroethylene.  [3] 80 grams.  [4] 40 grams.

Other examples from said copending application which are well adapted for fabrication in accordance with the present invention are those employing metals together with metallo compounds as the fluorine acceptor, in which case part or all of the metal acceptor may be incorporated in structural reinforcement and the remaining fluorine acceptor may be incorporated in the balance of the composition as aforesaid. Such examples comprise (Table B):

of, and alloys of any of the foregoing with at least one other metal,
(d) said fluorine material being of the class of organic compounds containing carbon and constituent material selected from the group consisting of the halogens, hydrogen, nitrogen, oxygen and combinations thereof, with the limitation that said constituent material comprises fluorine atoms,
(e) said fluorine material being present in said unit in

Table B

| Example No. | Code No. | Fluorine Donor | | Fluorine Acceptor | | | | Oxygen Oxidants | |
|---|---|---|---|---|---|---|---|---|---|
| | | Grams or Moles | Compound | Grams or Moles | Metal | Grams or Moles | Other | Moles | Compound |
| 18 | 189 | 125 g [1] | Teflon Powder | 9.0 g | Al | 32 g | LiH | | |
| 19 | 190 | 31 g | Viton A | 44 g | Al | 9.0 g | LiH | | |
| 20 | 202 | 0.1 [2] m | Viton A | 0.1 m | Al | 0.3 m | LiH | { 0.05  0.15 } | Lithium Perchlorate + ammonium nitrate. |

[1] Based on tetrafluoroethylene.
[2] Based on perfluoropropylene; although this polymer contains vinylidene fluoride therewith, reportedly in about equimolar proportions.

Based on the general disclosure herein, it will be obvious to those skilled in the art that other suitable metals, with and without other metallo fluorine acceptors e.g., metal hydrides and nitrides, etc., and with and without oxygen containing oxidants as aforesaid, can be employed in lieu of the metals, metal hydrides, and other components cited in the above examples, and that the aforesaid examples thus are illustrative and not restrictive of the invention.

While there have been described herein what are at present considered preferred embodiments of the invention, it will be obvious to those skilled in the art that minor modifications and changes may be made without departing from the essence of the invention. It is therefore to be understood that the exemplary embodiments are illustrated and not restrictive of the invention, the scope of which is defined in the appended claims, and that all modifications that come within the meaning and range of equivalency of the claims are intended to be included therein.

We claim:
1. A high energy fuel unit, said fuel unit
(a) employing as its principal exothermal reactants an amount such that its halogen content is at least essentially stoichiometrically equivalent to said structural reinforcing metal, and
(f) said oxygen material being present in said unit in the form of per-oxy-acid salt of an inorganic acid for supplying oxygen for reacting with oxidizable residues of said fluorine material.

2. A fuel unit as defined in claim 1, said organic fluorine material being polymeric and said per-oxy-acid salt being dispersed therein.

3. A fuel unit as defined in claim 2 in which said oxygen material essentially comprises lithium perchlorate.

4. A fuel unit as defined in claim 2 in which said oxygen material essentially comprises ammonium perchlorate.

5. A high energy fuel unit, said fuel unit
(a) employing as its essential and predominant exothermal reactants metal material and fluorine material,
(b) said metal material being present in said unit in at least substantial part in the form of structural reinforcing metal,
(c) said structural reinforcing metal being selected from the class consisting of beryllium, magnesium, aluminum, titanium, combinations of two or more thereof, and alloys of any of the foregoing with at least one other metal, (d) said fluorine material being of the class of organic compounds containing carbon and constituent material selected from the group consisting of the halogens, hydrogen, nitrogen, oxygen and combinations thereof with the limitation that said constituent material comprises fluorine atoms, and (e) said fluorine material being present in said unit in an amount such that its halogen content is at least essentially stoichiometrically equivalent to said structural reinforcing metal.

6. A high energy fuel unit as claimed in claim 5, wherein said structural reinforcing metal is in the form of thin walls.

7. A high energy fuel unit as claimed in claim 6, wherein the said thin walls are of expanded metal form.

8. A high energy fuel charge, comprising an assembly of a plurality of fuel units each as claimed in claim 5, but of different physical structures for controlling the burning rates.

9. A high energy fuel charge as claimed in claim 8, said assembly being formed to provide a cavitation extending through a plurality of said units.

10. A high energy fuel unit, said fuel unit (a) employing as its essential and predominant exothermal reactants metal material and fluorine material, (b) said metal material being present in said unit in at least two substantial parts, the first substantial part of said metal material being in the form of structural reinforcing metal, and the second substantial part of said metal material being in the form of particulate fuel selected from the class consisting of the metals, metal hydrides and combinations thereof, (c) said structural reinforcing metal being selected from the class consisting of beryllium, magnesium, aluminum, titanium, combinations of two or more thereof, and alloys of any of the foregoing with at least one other metal, (d) said fluorine material being of the class of organic compounds containing carbon and constituent material selected from the group consisting of the halogens, hydrogen, nitrogen, oxygen and combinations thereof, with the limitations that said constituent material comprises fluorine atoms, (e) said fluorine material being present in said unit in an amount such that its halogen content is at least essentially stoichiometrically equivalent to the metal of said metal material, and (f) said particulate fuel being dispersed in said fluorine material.

11. A high energy fuel unit as claimed in claim 10, in which said fluorine material is polymeric.

12. A high energy fuel unit as claimed in claim 10, in which said fluorine material is a solid polymer.

13. A high energy fuel unit as claimed in claim 10, in which said fluorine material is a curable rubbery polymer of the aforesaid constituents.

14. A high energy fuel unit as claimed in claim 13, the curable rubbery polymer having been cured in place with the structural metal portion of the unit.

References Cited in the file of this patent

UNITED STATES PATENTS

| | | |
|---|---|---|
| 1,506,323 | O'Neill | Aug. 26, 1924 |
| 1,530,692 | Paulus | Mar. 24, 1925 |
| 2,408,252 | Ganahl | Sept. 24, 1946 |
| 2,622,277 | Bonell et al. | Dec. 23, 1952 |
| 2,802,332 | Orsino | Aug. 13, 1957 |
| 2,857,258 | Thomas | Oct. 21, 1958 |
| 2,900,242 | Williams et al. | Aug. 18, 1959 |
| 2,939,275 | Loedding | June 7, 1960 |
| 2,970,898 | Fox | Feb. 7, 1961 |
| 2,977,885 | Perry et al. | Apr. 4, 1961 |

FOREIGN PATENTS

| | | |
|---|---|---|
| 524,032 | Canada | Apr. 17, 1956 |

OTHER REFERENCES

Zaehringer: "Solid Propellant Rockets, Second Stage," American Rocket Co., Box 1112, Wyandotte, Mich. (1958), pp. 229–30.

Chemical and Engineering News, Jan. 6, 1958, pp. 79–81.

Zaehringer: "Solid Propellant Rockets, Second Stage," American Rocket Co., Box 1112, Wyandotte, Mich. (1958), pp. 209–219.